Figure 1:
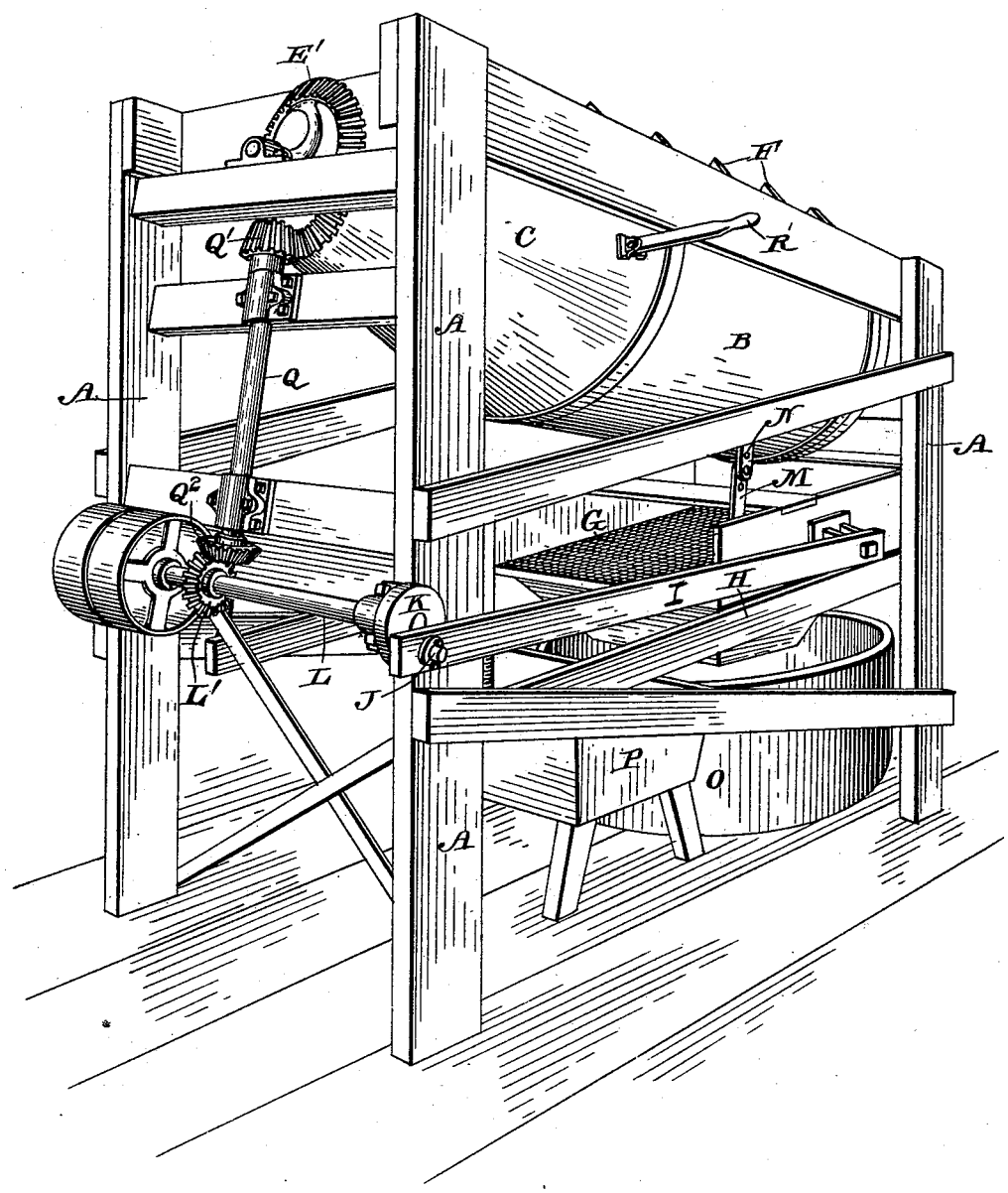

(No Model.) 3 Sheets—Sheet 1.

F. B. MERRILL & G. H. LOVELL.
CORN SILKER.

No. 538,787. Patented May 7, 1895.

Witnesses
Severance
Parks R. McBride

Inventors
Ferdinand B. Merrill
and George H. Lovell
by W. H. Babcock
Attorney

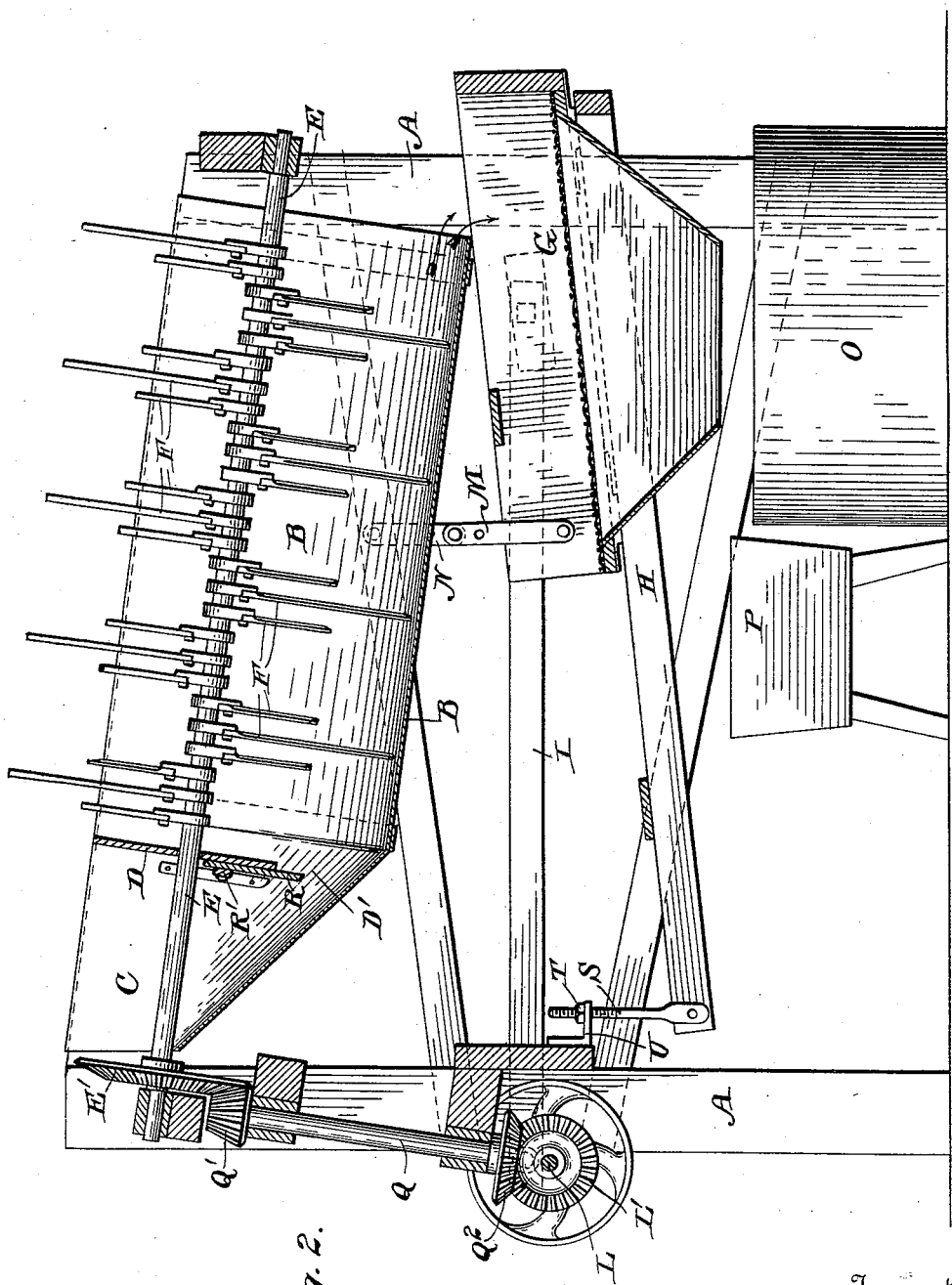

(No Model.) 3 Sheets—Sheet 3.
F. B. MERRILL & G. H. LOVELL.
CORN SILKER.
No. 538,787. Patented May 7, 1895.
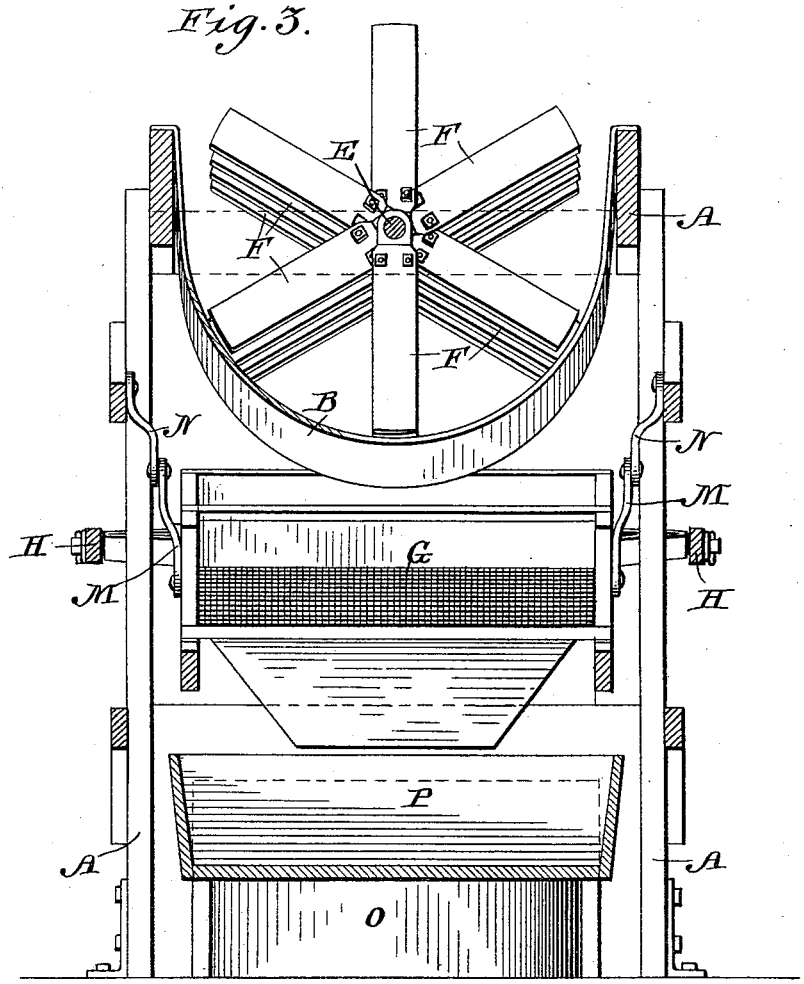
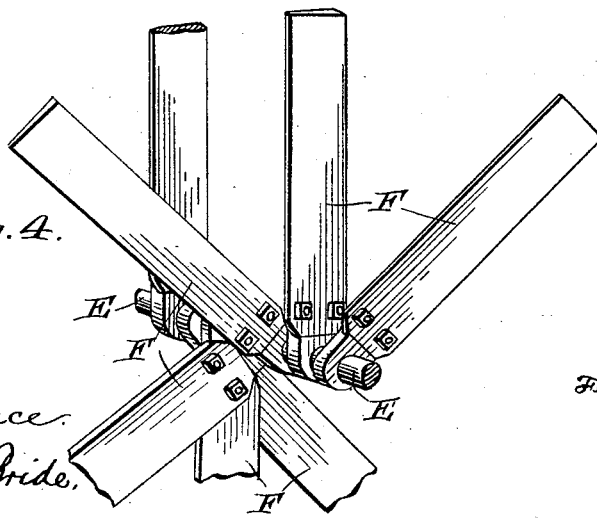
Witnesses
Severance
Parks R. McBride
Inventors
Ferdinand B. Merrill
and George H. Lovell
by W. H. Babcock
Attorney.
THE NORRIS PETERS CO., PHOTO-LITHO., WASHINGTON, D. C.

UNITED STATES PATENT OFFICE.

FERDINAND B. MERRILL AND GEORGE H. LOVELL, OF YARMOUTHVILLE, MAINE.

CORN-SILKER.

SPECIFICATION forming part of Letters Patent No. 538,787, dated May 7, 1895.

Application filed October 5, 1894. Serial No. 524,993. (No model.)

*To all whom it may concern:*

Be it known that we, FERDINAND B. MERRILL and GEORGE H. LOVELL, citizens of the United States, residing at Yarmouthville, in the county of Cumberland and State of Maine, have invented certain new and useful Improvements in Corn-Silkers; and we do hereby declare the following to be a full, clear, and exact description of the invention, such as will enable others skilled in the art to which it appertains to make and use the same.

The ordinary treatment of green sweet corn in preparing it for canning is as follows: First the husks are removed from the ears exposing the green corn. The ears are then run through a cutting machine which cuts off the corn from the cob. The silk is necessarily left with the corn as well as some parts of the husk and the cob, which by accident were not removed in the procedures above stated. These worthless particles are then removed from the corn by a machine called a silker.

The object of the present invention is to provide improved mechanism for this latter purpose.

To this end the said invention consists chiefly in the combination of a trough or receptacle which receives the corn with a shaft rotating therein, said shaft being furnished with arms, blades or paddles that strip off the silk, and also work the corn along toward the lower open end of the receptacle. These blades are wedge-shaped to assist in thus moving it.

The said invention also consists in the combination of an open end sieve which receives the corn and the fragments of husks and cobs from the said receptacle with mechanism hereinafter described for reciprocating the said sieve and jolting the open end thereof, in order to facilitate the separation of the corn from the worthless parts aforesaid.

Our invention also consists in certain additional details of construction and combination hereinafter set forth and claimed.

In the accompanying drawings, Figure 1 represents a perspective view of a machine embodying our invention. Fig. 2 represents a vertical longitudinal section of the same, showing in elevation the rotary shaft and its blades, as well as the final receptacles for the corn and the refuse. Fig. 3 represents a cross-section through Fig. 2 on a plane a little in advance of the link M and looking toward the rear or discharge end of the machine; and Fig. 4 represents a detail perspective view, on an enlarged scale, of a part of the said shaft with its attached arms and blades.

A designates the fixed supporting frame of the machine; B, the trough or semi-cylindrical receptacle secured in an inclined position to the upper part of the said frame; C, a hopper to receive the corn as it comes from the cutters and deliver it to the said receptacle through an opening D' at the bottom of the partition D between them, and E a horizontal shaft, extending longitudinally through the said trough or just above it and beyond the ends thereof. The said trough or receptacle inclines downward from the said hopper to its lower end, the latter being open. The said shaft is provided with radial arms, blades or paddles F, arranged in helical order and extending nearly to the inner face of the said trough. These arms, by their arrangement and rotation move the contents of the trough lengthwise of the same over its inner face to its lower open end, whence they drop as shown by an arrow in Fig. 2 into the upper end of an inclined sieve G arranged below. The said blades, arms or paddles are wedge-shaped in cross-section, so as to easily slip through the contents of the trough. While they do this, the silk is caught and carried on the said arms and may easily be removed from them afterward as found convenient. The action of said arms as they are carried around of course tends to break up the contents of the receptacle and separate the moist individual kernels of corn, so that they will pass through the sieve. This sieve, G, reciprocates longitudinally backward and forward on guide-ways H attached to the frame A, this motion being given by a pitman I and a crank-pin J, the latter on a disk K of the main driving-shaft L. The open lower end of the said sieve is given in addition a lifting or jolting motion at each reciprocation, by reason of a pivoted link or hanger M which suspends the said open end from a standard N rigid with the said frame. As a result of the motions thus given to the said sieve, the corn is shaken down through it into the corn cooler O while the broken cobs and other refuse are discharged from the open end of the said sieve into a waste-box P. The shaft E is driven from the said main-shaft L by bevel gears E' L' on these shafts respectively and by an interposed upright shaft Q provided at its ends with bevel gears Q' Q², meshing into the said gears E' L', or by any other suitable gearing. Of course the said shafts E L and Q are journaled in the said frame.

To regulate the supply of corn from the hopper to the receptacle, we employ a sliding gate R which closes more or less of the opening D', according to its position. This gate is provided with a handle R', extending out through the wall of the hopper, or the said gate may slide up and down, being operated from above.

The guideways H are made vertically adjustable at one end, which is otherwise left free, by means of a screw S and nut T, the said screw extending up from one of the supporting bars of the said guideways through a bracket U attached to the said frame and receiving the said nut above the said bracket. The supporting bars and guideways move together in the act of adjustment, and are held rigidly at one end as thus adjusted, the other end being hinged to the frame. By thus adjusting the inclination of the guideways, that of the sieve is correspondingly regulated, to secure its most efficient action. The inclination and the jolting action before described will free the sieve effectually from all clogging material; and by adjusting the sieve to the proper angle this clearing action may be attained in perfection while leaving the kernels of corn full opportunity to pass through the meshes of the sieve.

Having thus described our invention, what we claim as new, and desire to secure by Letters Patent, is—

1. In a corn-silking machine a corn receptacle open at one end and provided with a shaft and rotary blades for acting on the corn as described, in combination with a hopper communicating with the said receptacle, a partition between the said hopper and receptacle having an opening at the bottom, a gate arranged to slide vertically in guideways over this opening, and a lever pivoted to the outside of the hopper or receptacle and connected to the said gate to open or close the same as desired, all substantially as and for the purpose set forth.

2. In a corn-silking machine, a corn receptacle open at one end and provided with a shaft and rotary blades for acting on the corn as described, in combination with a hopper communicating with the said receptacle, a partition between the said hopper and receptacle having an opening at the bottom, a gate arranged to slide vertically in guideways over this opening, a lever pivoted to the outside of the hopper or receptacle and connected to the said gate to open or close the same as desired, an inclined sieve arranged under the said receptacle and having its lower end open and mechanism for reciprocating the said sieve longitudinally and tilting or jolting its free end substantially as set forth.

3. The inclined sieve G having its lower end open, in combination with its guideways, a pair of links by which its open end is hung pivotally, a driving shaft crank and pitman for effecting the reciprocation of the said sieve, and devices for adjusting vertically one end of the guide-ways to vary at will the inclination and tilting of the said sieve substantially as set forth.

In testimony whereof we affix our signatures in presence of two witnesses to each.

FERDINAND B. MERRILL.
GEORGE H. LOVELL.

Witnesses as to signature of Ferdinand B. Merrill:
    LEONE R. COOK,
    WILLIAM H. MARSTON.

Witnesses as to signature of George H. Lovell:
    WILMOT W. BARRIE,
    CHARLES F. DUKE.